(12) United States Patent
Shin et al.

(10) Patent No.: US 12,399,600 B1
(45) Date of Patent: Aug. 26, 2025

(54) CONTACT SPACE DETERMINATION FOR USER INTERFACE CONTROL

(71) Applicant: Google LLC, Mountain View, CA (US)

(72) Inventors: Dongeek Shin, San Jose, CA (US); Anuva Kulkarni, Santa Clara, CA (US); Tianyu Xu, Mountain View, CA (US); Lidan Mu, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/586,122

(22) Filed: Feb. 23, 2024

(51) Int. Cl.
| | |
|---|---|
| *G06F 3/04815* | (2022.01) |
| *G06F 3/01* | (2006.01) |
| *G06F 3/0346* | (2013.01) |
| *G06F 3/04845* | (2022.01) |
| *G06F 3/0487* | (2013.01) |

(52) U.S. Cl.
CPC .......... *G06F 3/04815* (2013.01); *G06F 3/011* (2013.01); *G06F 3/017* (2013.01); *G06F 3/0346* (2013.01); *G06F 3/04845* (2013.01); *G06F 3/0487* (2013.01)

(58) Field of Classification Search
CPC .................................................. G06F 3/04815
See application file for complete search history.

(56) References Cited

U.S. PATENT DOCUMENTS

| | | | |
|---|---|---|---|
| 10,181,219 B1 * | 1/2019 | Murphy .................. | A63F 13/26 |
| 11,416,075 B1 | 8/2022 | Gong et al. | |
| 12,086,919 B2 * | 9/2024 | Zhang ..................... | G06F 3/013 |
| 2016/0267712 A1 * | 9/2016 | Nartker ................. | G06F 3/0325 |
| 2018/0005439 A1 * | 1/2018 | Evans .................... | G06T 19/006 |
| 2018/0322706 A1 * | 11/2018 | Drouin .................... | G06F 3/011 |
| 2020/0104039 A1 | 4/2020 | Robertson et al. | |
| 2020/0278763 A1 * | 9/2020 | Munakata ............. | G06F 3/0414 |
| 2021/0043011 A1 * | 2/2021 | Gates .................... | G02B 27/017 |
| 2021/0056764 A1 | 2/2021 | Lacey et al. | |
| 2022/0067378 A1 * | 3/2022 | Rabinovich ............. | G06F 3/011 |
| 2022/0308655 A1 | 9/2022 | Zhu et al. | |
| 2023/0117197 A1 | 4/2023 | Stolzenberg | |

OTHER PUBLICATIONS

International Search Report and Written Opinion for PCT Application No. PCT/US2025/016441, mailed on Jun. 3, 2025, 12 pages.

\* cited by examiner

*Primary Examiner* — Chun-Nan Lin
(74) *Attorney, Agent, or Firm* — Brake Hughes Bellermann LLP

(57) ABSTRACT

Described techniques enable a virtual touchpad for a wearable device by receiving, in response to a touch event, a sensor signal from a motion sensor coupled to the wearable device, the wearable device providing a user interface with a rendering space that is defined relative to the wearable device. The touch event may be associated with a contact space of a contact map defined with respect to the wearable device, based on the sensor signal, and a user interface event of the user interface that corresponds to the contact space may be rendered within the rendering space.

26 Claims, 11 Drawing Sheets

CONTACT SPACE DETERMINATION FOR USER INTERFACE CONTROL

BACKGROUND

Extended Reality (XR) devices typically provide a user interface (UI). Various types of UI control exist that are compatible with UIs of XR devices. For example, UI control may be implemented using physical buttons, image-based gesture recognition, or through the use of separate devices (e.g., handheld controllers).

SUMMARY

As described herein, a computing device may be configured to use touch events at one or more surfaces of the computing device to implement user interface control. Specifically, as described herein, a computing device such as an XR device may be configured to use touch events at one or more surfaces of the XR device to implement user interface control. The user interface control may include any manipulation of an XR user interface element or aspect, including spatial rendering of desired effects. For example, a location or position on an XR device at which a touch event occurs may be related to a rendering event at a corresponding rendering location within the user interface of the XR device. In other examples, a contact space that occurs in conjunction with a touch event may be captured, where a contact space refers to, e.g., a size, area, shape, or location of a surface area of an XR device surface at which contact of a touch event occurs, including movement of the touch event across the surface area of the XR device. A rendering event may be initiated in response to characteristics (e.g., a location, shape, size, area, or movement) of the contact space. Thus, XR devices may be provided with a highly customizable set of user interface controls, which may be convenient to use. Moreover, such user interface controls may be provided without consuming dedicated space on the surface of the XR device (such as might be required for installing buttons or other control devices). Although at least some of the description is related to an XR device, the concepts described herein can be applied to any type of computing device such as a mobile phone, laptop computing device, smart device, and/or so forth.

In a general aspect, a method includes receiving, in response to a touch event, a sensor signal from a motion sensor mounted on a device, the device providing a user interface with a rendering space that is defined relative to the device. The method includes relating the touch event to a contact space defined with respect to the device, based on the sensor signal, and rendering a user interface event of the user interface within the rendering space that corresponds to the contact space.

In another general aspect, a computer program product is tangibly embodied on a non-transitory computer-readable storage medium and comprises instructions. When executed by at least one computing device (e.g., by at least one processor of the at least one computing device), the instructions are configured to cause the at least one computing device to receive, in response to a touch event, a sensor signal from a motion sensor mounted on a device, the device providing a user interface with a rendering space that is defined relative to the device. When executed by at least one computing device (e.g., by at least one processor of the at least one computing device), the instructions are configured to cause the at least one computing device to relate the touch event to a contact space defined with respect to the device, based on the sensor signal. When executed by at least one computing device (e.g., by at least one processor of the at least one computing device), the instructions are configured to cause the at least one computing device to render a user interface event of the user interface within the rendering space that corresponds to the contact space.

In another general aspect, a wearable device includes at least one frame for positioning the wearable device on a body of a user, at least one display, at least one processor, and at least one memory storing instructions. When executed, the instructions cause the at least one processor to receive, in response to a touch event, a sensor signal from a motion sensor mounted on a device, the device providing a user interface with a rendering space that is defined relative to the device. When executed, the instructions cause the at least one processor to relate the touch event to a contact space defined with respect to the device, based on the sensor signal. When executed, the instructions cause the at least one processor to render a user interface event of the user interface within the rendering space that corresponds to the contact space.

The details of one or more implementations are set forth in the accompanying drawings and the description below. Other features will be apparent from the description and drawings, and from the claims.

DETAILED DESCRIPTION

Figure 1A:
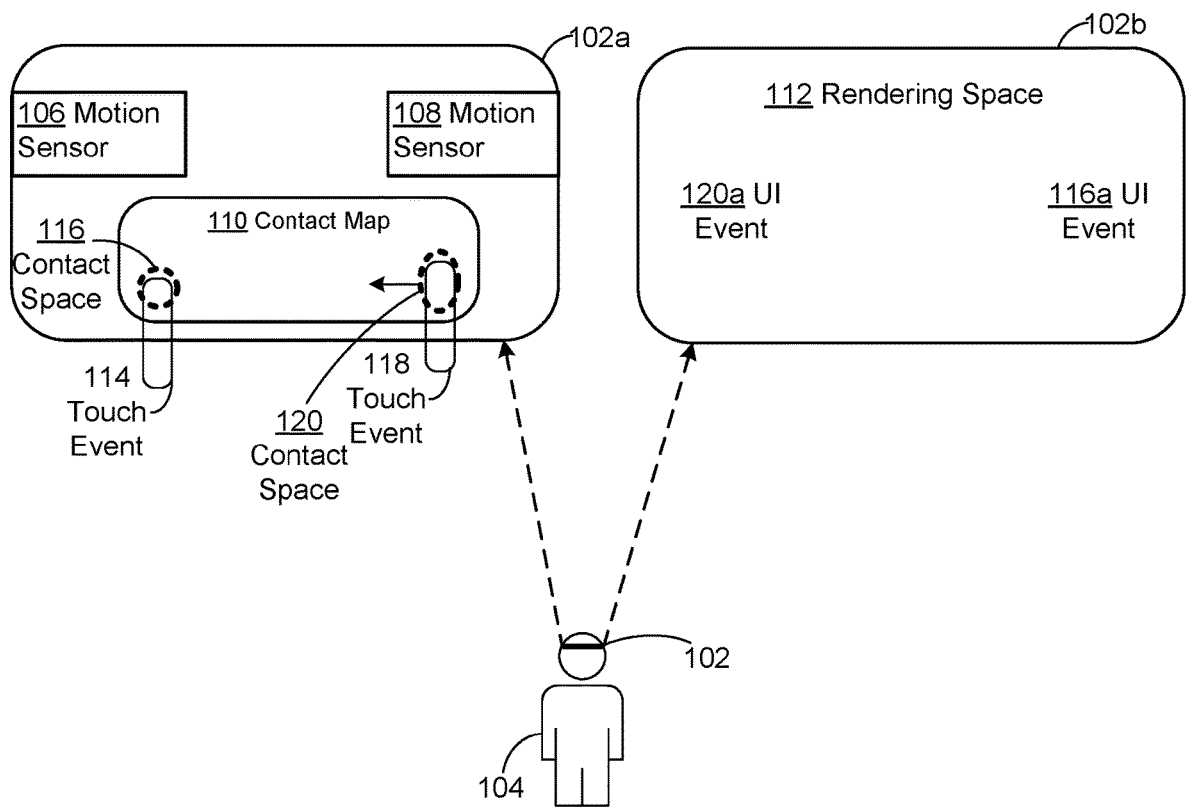
FIG. 1A illustrates an example implementation of a system for contact space determination for user interface (UI) control.

Described systems and techniques enable use of touch events occurring at a computing device for user interface (UI) control of a user interface of the computing device. For example, the systems and techniques described herein enable use of touch events occurring at a computing device such as an XR device for user interface control of a user interface of the XR device. For example, such touch events may include any contacts between the XR device, e.g., a surface of the XR device, and any other object(s), including, e.g., a finger or a stylus. Touch events may include, e.g., tapping, pressing, holding, swiping, pinching, zooming, rotating, or any other type of touch or contact.

Such touch events may be used to control rendering events or other user interface events occurring within a rendering space of the user interface of the XR device. For example, one or more motion sensors of the XR device may be used to define, characterize, or otherwise determine a contact space that refers to a portion of the XR device at which contact occurs, as in the case of a touch event.

The contact space may be characterized with respect to a size, shape, area, location, or movement of a contact or other touch event at or across the XR device surface. For example, the contact space may be determined at a certain position(s) and with a certain size/shape within a contact map. The contact map may provide a bounded area of the XR device surface in which touch events and corresponding contact spaces may be detected.

The contact space may be used to control the user interface of the XR device, including, e.g., initiating a rendering event at a location within the rendering space that corresponds to the location of the contact space within the contact map. In the present description, as described in more detail, below, a rendering space refers to any virtual or physical space around an XR device in which user interface elements or aspects may be rendered. For example, a rendering space may include a virtual reality room or other setting rendered by the XR device. In an augmented reality context, the rendering space may refer to a physical area surrounding the XR device in which virtual objects or other interface elements may be rendered. Thus, a rendering event includes any user interface event that is caused to occur by the XR device within the rendering space of the user interface of the XR device. Although at least some of the description is related to an XR device, the concepts described herein can be applied to any type of computing device such as a mobile phone, laptop computing device, smart device, and/or so forth.

For example, two fingers touching the contact map may occupy more contact space than one finger touching the contact map. In either case, the contact space may be mapped to the rendering space, so that a subsequent rendering event or other user interface event may occur in a defined manner within the rendering space. For example, when creating a punch-through effect for a virtual reality (VR) context, a two-finger contact space may result in a larger punch-through area than a one-finger contact space.

At least one technical problem solved by the described techniques includes providing user interface control in XR environments. At least one technical problem solved by the described techniques includes providing user interface control for XR devices that have a small form factor and correspondingly small device area to use for providing user interface control. At least one technical problem solved by the described techniques includes providing a large number of configurable user interface control options that can be related to a user interface of XR devices.

At least one solution to the above and other technical problems includes defining a contact map with respect to a device area, e.g., device surface area, of an XR device. Then, by detecting a contact space associated with a touch event that occurs within the contact map, the contact space may be related to a rendering space of a user interface of the XR device. Since virtually any contact space may be detected at any defined location of the device surface area/contact map, corresponding user interface control options (e.g., a large number of corresponding user interface control options) may be made available.

In existing XR devices, as referenced above, user interface control may be achieved using a variety of known techniques. For example, buttons (or other physical input devices) may be installed on a head mounted device (HMD), such as glasses or goggles, and user interface events may be initiated in response to operation of the physical buttons. However, such physical input devices require hardwiring and occupy space within a surface area of an XR device, thereby potentially increasing (or preventing a reduction of) a form factor of the XR device.

In other examples, separate devices may be in communications with an XR device, such as a HMD, and may be used for user interface control of the XR device. For example, a smartwatch, smartphone, smartring, or handheld controller may be used to control an HMD. However, some HMDs do not provide or interact with such separate devices in a desired manner, and not all users may have access to such separate devices at a time of use of an HMD. Moreover, it may be difficult to configure desired types of interoperability, with desired levels of accuracy, between the HMD and the various control devices.

In still other examples, a sensor of the XR device may be used to capture sensor signals that reflect interactions of a user with the XR device. For example, a camera of an HMD may be used to provide eye gaze tracking, or a motion sensor may be used to implement head gaze tracking.

In other examples, a camera may be used to capture an image of a hand gesture of a user, or a motion sensor may be used to capture a touch event of a user with the XR device. Then, a machine learning (ML) model may be used to classify the sensor signals as corresponding to one or more defined gestures, which may then be related to implementing corresponding user interface events. For example, a convolutional neural network (CNN) may be trained to recognize a defined set of hand gestures (e.g., pinching, waving, or pointing), each of which may then be related to corresponding user interface events (e.g., zooming, scrolling, or selecting a user interface element).

In related examples, a touch event (e.g., tapping) may be recognized by using a motion sensor mounted on an HMD. For example, a linear regression model may be trained to relate one or more touch events to one or more classifications of gestures for user interface control. Similar to image-based gesture control, such techniques are generally limited to a small set of available, recognizable gestures. Moreover, such techniques may be limited to XR device surfaces that are proximate to the motion sensor being used for signal detection. Still further, such techniques, and various other ones of the user interface control techniques referenced above, may be difficult to calibrate across multiple XR devices or types of XR devices, so as to be functional in a desired manner for a large number and variety of users.

In example techniques described herein, a contact map may be defined with respect to any desired surface of an XR device. For example, a contact map may be defined with respect to an arm of a pair of smartglasses, or a face of a pair of XR goggles. Within the contact map, any device surface portion that is touched may be associated with a contact space. Characteristics of the contact space may then be used to implement user interface control for the XR device being used.

Using such techniques, a location of a contact map and/or contact space may be mapped to a rendering space of the XR user interface. That is, extended Reality (XR) devices are capable of spatial rendering, in which a user interface (UI) is defined relative to a corresponding XR device, and user interface events are rendered within a rendering space that is defined relative to a physical position of the corresponding XR device. For example, a user of XR goggles may experience a virtual object rendered at a certain distance from the XR goggles, or at a certain height or other position defined relative to the XR goggles.

Therefore, for example, a contact space on one side of the XR device may correspond to a rendering or other user interface control event on the same side of the rendering space of the XR device. For example, touching the right side of the XR device may result in a control event at a right side of the rendering space. In other examples, as referenced above, a size of the contact space may dictate a size of a corresponding rendering space or rendering event.

Detected contact spaces need not be limited to a predefined set of detectable gestures for user interface control. Rather, virtually any desired gesture may be defined and detected with respect to a corresponding contact space. Moreover, described techniques may be easily calibrated across many types of computing devices such as XR devices.

FIG. 1A illustrates an example implementation of a system for contact space determination for user interface control. In the example of FIG. 1, a wearable device 102 is illustrated as being worn by a user 104. For example, the wearable device 102 may represent a head-mounted device (HMD), such as smartglasses or smart goggles. Although this example is directed to a HMD device, the concepts described herein can be applied to any type of computing device such as a mobile phone, laptop computing device, smart device, and/or so forth.

FIG. 1A further illustrates a device surface 102a of the HMD 102 and a user interface 102b provided by the HMD 102. For example, the device surface 102a may include any one or more surface areas of the HMD 102 that may be touched or otherwise contacted by the user 104. For example, when the HMD 102 represents a pair of smart goggles, the device surface 102a may represent a front surface of the smart goggles (e.g., viewable from a point of view of facing the user 104 while the user 104 is wearing the smart goggles).

More generally, the device surface 102a may represent a top, side, or bottom surface of smart goggles. When the HMD 102 represents smartglasses, as in FIGS. 8A and 8B, the device surface 102a may represent any surface on the arms or frame of the smart glasses. Although shown in the singular in the simplified example of FIG. 1A, it will be appreciated that two or more device surfaces may be defined for purposes of providing user interface control as described herein.

The user interface 102b is illustrated from a point of view of the user 104 when wearing the HMD 102. In other words, the user interface 102b is seen by the user 104 when wearing the HMD 102. The user interface 102b may include, for example, a Virtual Reality (VR) interface in which the user 104 is immersed in a 360° field of view provided by an associated application. In other examples, the user interface 102b may include an Augmented Reality (AR) interface in which the user 104 has visibility with respect to a surrounding physical environment, and various virtual user interface elements or aspects are superimposed on, or otherwise added to or shown in the context of, the physical environment. Any other suitable type of user interface that may be provided by the HMD 102 may be used, as well.

The HMD 102 may include one or more motion sensors, represented in FIG. 1A in block diagram form by a motion sensor 106 and a motion sensor 108. For example, the motion sensors 106, 108 may represent one or more of an inertial measurement unit (IMU), an accelerometer, a gyroscope, a magnetometer, or any other known or future device for detecting a motion of the HMD 102.

As described in detail, below, sensor signals from one or more of the motion sensors 106, 108 may be processed by the HMD 102 (and/or connected devices) to detect and process user interactions with a contact map 110 defined with respect to the device surface 102a. Although illustrated in the singular in the simplified example of FIG. 1A, the contact map 110 may represent one or more defined areas of the device surface 102a.

The contact map 110 may be used to control operations of the user interface 102b. For example, the user interface 102b is illustrated as including a rendering space 112, which may include a spatially defined region or area of the user interface 102b and/or of a surrounding physical environment of the user 104. For example, in a VR context, the rendering space 112 may include an immersive, rendered 360° VR environment. In an AR context, the rendering space 112 may include a virtual spatial region overlaid on a surrounding physical environment of the user 104. In this way, for example, virtual objects or other virtual user interface elements (e.g., user interface control elements) may be placed within the rendering space 112.

The rendering space 112 may thus represent a coordinate space of any physical or virtual location, or combination thereof, that may be defined with respect to the HMD 102. For example, the rendering space may represent coordinates within a physical space such as a room, an arena, or an outdoor space, or within a virtual space, which could include virtually any virtual location capable of being rendered by the HMD 102. The rendering space 112 may also represent a common coordinate system that is applied across both a physical and virtual environment.

Within the defined area of the contact map 110, a touch event 114 may be associated with a contact space 116 for control of operations of the user interface 102b, including control of events within the rendering space 112. That is, using techniques described below, sensor signals from the motion sensors 106, 108 that occur in response to the touch event 114 may be processed to determine the contact space 116 within the contact map 110.

For example, the user 104 may touch the contact map 110 with one or more fingers, or with a stylus, or using any other suitable object to physically interact with or touch the contact map 110. In many of the following examples, for the sake of simplicity and consistency of explanation, the touch event 114 (and other touch events) are generally referenced with respect to a finger(s) of the user 104 touching the contact map 110.

The contact space 116 thus refers to an included area or subset of space of the contact map 110, which corresponds in size, extent, position, and direction to the touch event 114. For example, a touch event that consumes more area of the contact map 110 will result in a larger contact space.

For example, in FIG. 1A, a touch event 118 is illustrated as being associated with a larger contact space 120 than the contact space 116 associated with the touch event 114. For example, the touch event 118 may relate to a greater extent or portion of a finger of the user 104 being positioned on the contact map 110 than the touch event 114. For example, the touch event 114 may correspond to a fingertip of the user 104 being in contact with the contact map 110, while the touch event 118 may correspond to a larger portion of the finger of the user 104 being in contact with the contact map 110.

Further, and as also illustrated, a touch event, such as the touch event 118, need not be static, and may reflect or include a dynamic movement of a finger of the user 104 within, and with respect to, the contact map 110. Additionally, the touch event 114 and the touch event 118 may occur separately or together, and various other types of touch events may be detected, as well, some of which are described below by way of further example.

In response to the contact space 116 being detected, a corresponding user interface event 116a may be implemented within a context of the user interface 102b, e.g., within the rendering space 112. Similarly, in response to the contact space 120 being detected, a corresponding user interface event 120a may be implemented.

The user interface events 116a, 120a may represent virtually any user interface event that is associated with operation or use of the user interface 102b. Such user interface events may include, by way of non-limiting example, user interface object or element selections, or any user interface action associated with operations of an application that provides the user interface 102b (e.g., a browser, a game, an image/video display, or any other type of application).

The user interface events 116a, 120a may also represent any event(s) that affects operations of the user interface 102b that may be common to the HMD 102 across multiple applications or uses of the HMD 102. For example, as described in more detail with respect to FIGS. 5 and 6, the user interface event 116a may represent a punch-through event or punch-through window, in which a window or area is provided within an immersive VR environment to enable the user 104 to easily view a surrounding physical environment.

Advantageously in FIG. 1A, a surface area of the contact map 110 may be mapped in virtually any desired relationship to the user interface 102b, e.g., to the rendering space 112. Thus, for example, a position of any touch event and associated contact space within the contact map 110 may be spatially mapped to the user interface 102b, e.g., to the rendering space 112.

For example, as mentioned above, the device surface 102a may represent a forward-facing surface of a pair of smart goggles as the HMD 102. In such examples, the touch event 114 may represent a finger of the user 104 touching the contact map 110 in a direction to the right side of the user 104, while the touch event 118 may represent a finger of the user 104 touching the contact map 110 in a direction to the left side of the user 104 (that is, reversed from the illustrated view of FIG. 1A, in which the touch event 114 is illustrated to the left of the touch event 118).

Then, the contact space 116 may be mapped to the rendering space 112 with the user interface event 116a being implemented toward the right side of the user 104 as the user 104 looks ahead, and, similarly, with the user interface event 120a being implemented toward the left side of the user 104. For example, if the user interface events 116a, 120a include punch-through events, then the user 104 may easily obtain a desired punch-through event (e.g., may obtain visibility in a desired direction(s)), simply by touching the contact map 110 at corresponding locations.

More generally, virtually any desired mapping may be implemented between the contact map 110 and the user interface 102b, e.g., within the rendering space 112. Such mappings may be implemented regardless of where on the device surface 102a the contact map 110 is positioned.

Moreover, such mappings may be implemented in 1, 2, or 3 dimensions within the rendering space 112. For example, the touch event 114 and contact space 116 may be related to a defined point within the rendering space 112, or movement of the contact space 120 across a surface of the contact map 110 may be related to x, y coordinates within the rendering space 112.

Further, the contact map 110 may be positioned on a portion of the device surface 102a that is positioned in a direction that is perpendicular to an x,y plane of the rendering space 112. For example, the HMD 102 may include smartglasses, and the device surface 102a may represent an arm of the smartglasses supported on an ear of the user 104 and perpendicular to lenses of the smartglasses.

Then, the touch event 118 may represent a motion occurring along a length of the arm of the smartglasses, in a z or depth direction within the rendering space 112. For example, the rendering space 112 may include the type of immersive 3D VR environment referenced above, or the type of AR environment referenced above that is rendered within a 3D environment of the user 104. For example, a 3D VR environment may include virtual objects positioned at various depths, while the AR environment may include virtual objects placed relative to real-world objects in a surrounding environment of the user 104.

Therefore, using described techniques, the user 104 may easily select or utilize any such virtual objects, or reference any real-world objects, at any desired depth. Moreover, multiple implementations of the contact map 110 may be included on the HMD, to provide full 3D control within the rendering space 112.

For example, a first implementation of the contact map 110 may be placed on a front or left surface of the HMD 102, while a second implementation of the contact map 110 may be placed on a right surface of the HMD 102. The first implementation of the contact map 110 may then be used to control left-right movements, e.g., of a cursor in the rendering space 112, while the second implementation of the contact map 110 may be used to control forward-back movement, e.g., of the cursor. Such embodiments therefore enable easy and intuitive user interface control, even in 3D immersive environments.

Various other types of user interface control may be provided, as well. For example, the HMD 102 may include various types of hardware sensors or other devices, including output devices. For example, the HMD 102 may include a camera(s), microphone(s), speaker(s), and various other hardware elements. Therefore, the contact map 110 may enable control of corresponding user interfaces with such devices, in order to control their operation(s). Using techniques described herein, such control may include directional aspects.

For example, multiple cameras, speakers, or microphones may be positioned around a frame of the HMD 102, each being, e.g., proximate to a corresponding one of the motion sensors 106, 108. Then, for example, the user 104 may preferentially select and operate a desired one of such devices by touching a corresponding portion of the contact map 110. For example, the user 104 may control operations of a microphone or speaker next to the motion sensor 108 by virtue of executing the touch event 118 to create the contact space 120 in a vicinity of the motion sensor 108.

Figure 4:
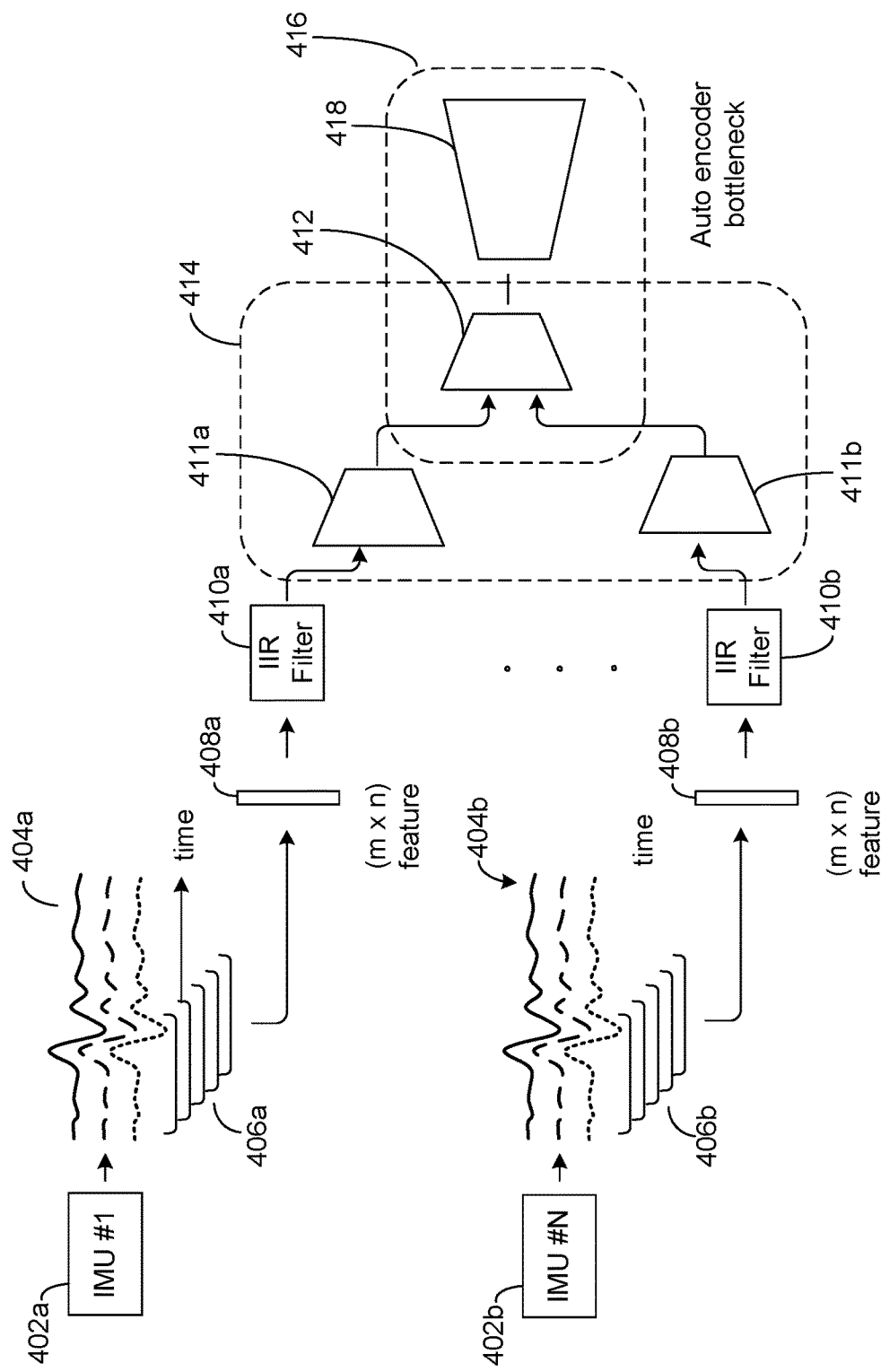
FIG. 4 is a block diagram of an alternate example of the system of FIG. 1B.
Figure 5:
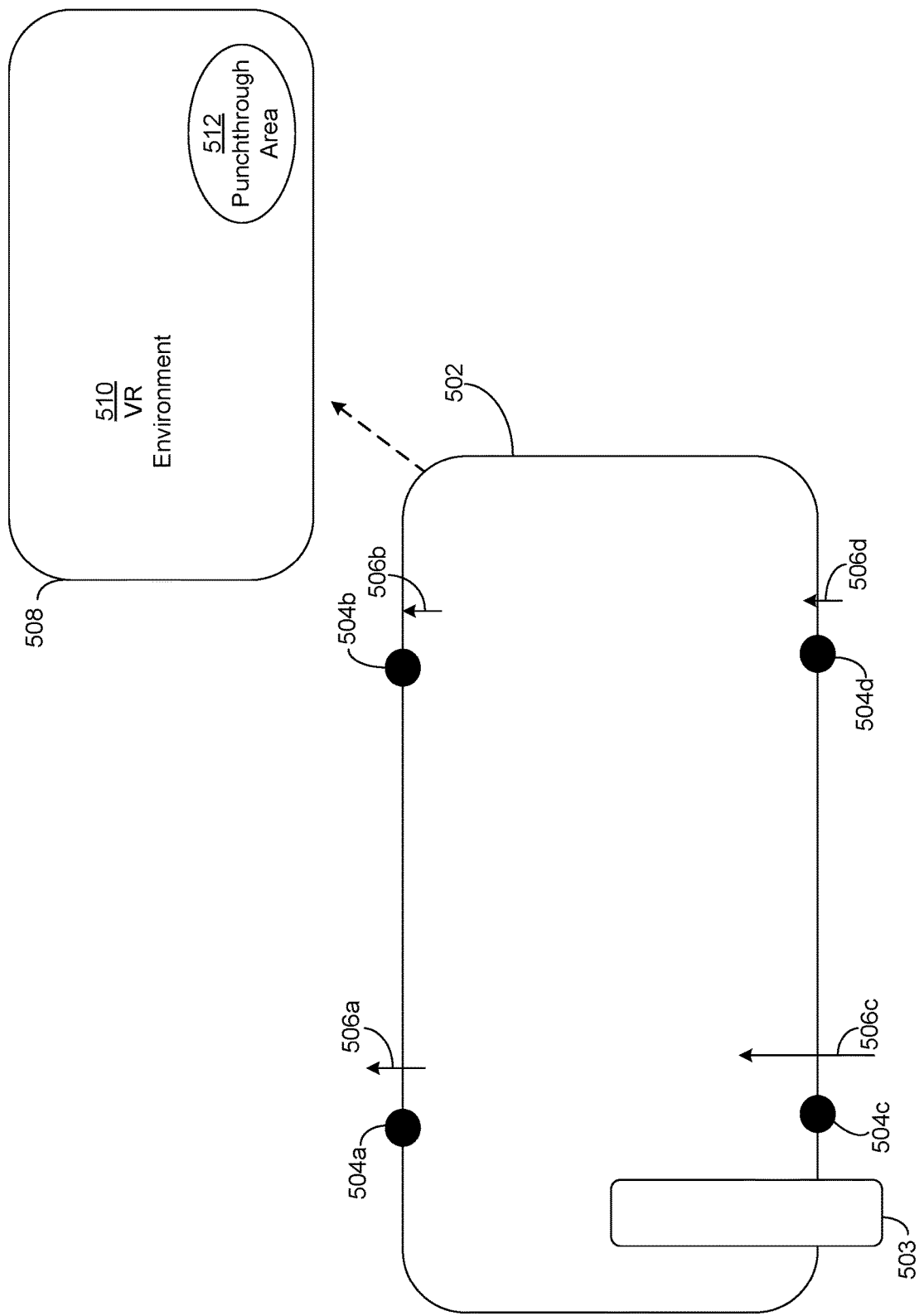
FIG. 5 illustrates an example use case scenario for the systems of FIGS. 1B and 4.
Figure 6:
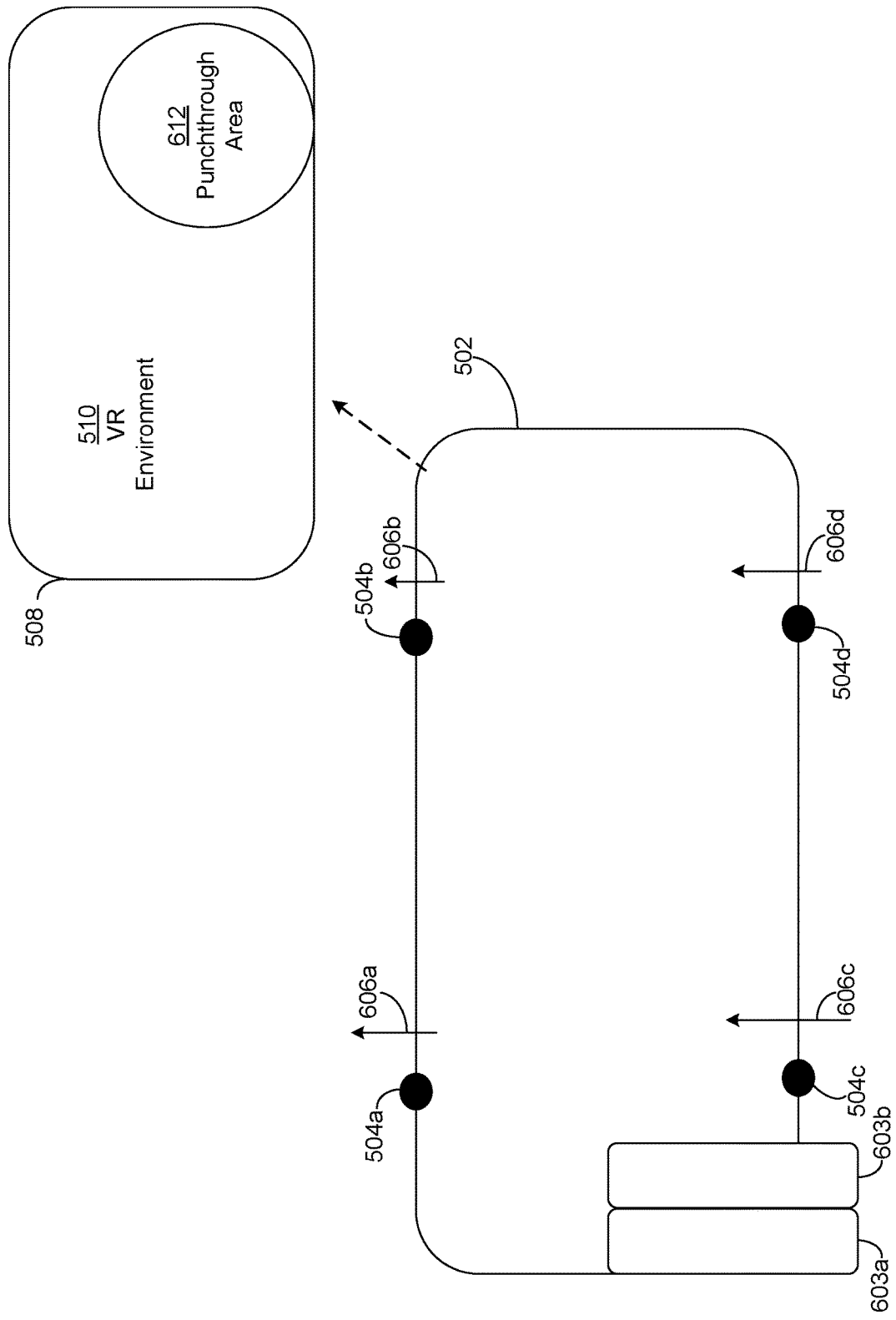
FIG. 6 illustrates a second example use case scenario for the systems of FIGS. 1B and 4.

More generally, as described in detail with respect to FIGS. 4-6, placement of multiple motion sensors 106, 108 relative to the device surface 102a results in a single touch event within the contact map 110 causing a distributed profile of sensor signals that facilitates determination of a corresponding contact space. For example, as shown with respect to FIGS. 5 and 6, the touch event 118 will result in a first sensor signal distribution in which a sensor signal of the motion sensor 108 is greater than a sensor signal of the motion sensor 106, while the touch event 114 will result in a second sensor signal distribution in which a sensor signal of the motion sensor 106 is greater than a sensor signal of the motion sensor 108. Such distributions of sensor signals may thus be used to infer or otherwise determine a location, movement, position, extent, and nature of the contact spaces 116, 120 within the contact map 110, which, as already described, may be used to provide positional and directional user interface control with respect to the user interface 102b and the rendering space 112.

Thus, the contact spaces 116, 120 may provide information for a total surface area of the contact map that is consumed by the corresponding touch events 114, 118, and/or a location within the contact map 110 that may be related to a corresponding location within the rendering space 112, or may otherwise be used to control one or more user interface event(s) 120a, 116a.

Described techniques may thus provide user interface control over a large field of view (FOV) while providing a complex and highly customizable gesture set. Moreover, even with respect to a single gesture, described techniques may enable differences in corresponding user interface events that depend on a recognized location within the contact map 110, and/or on a location of one or more of the contact map(s) 110 on the device surface 102a.

Figure 1B:
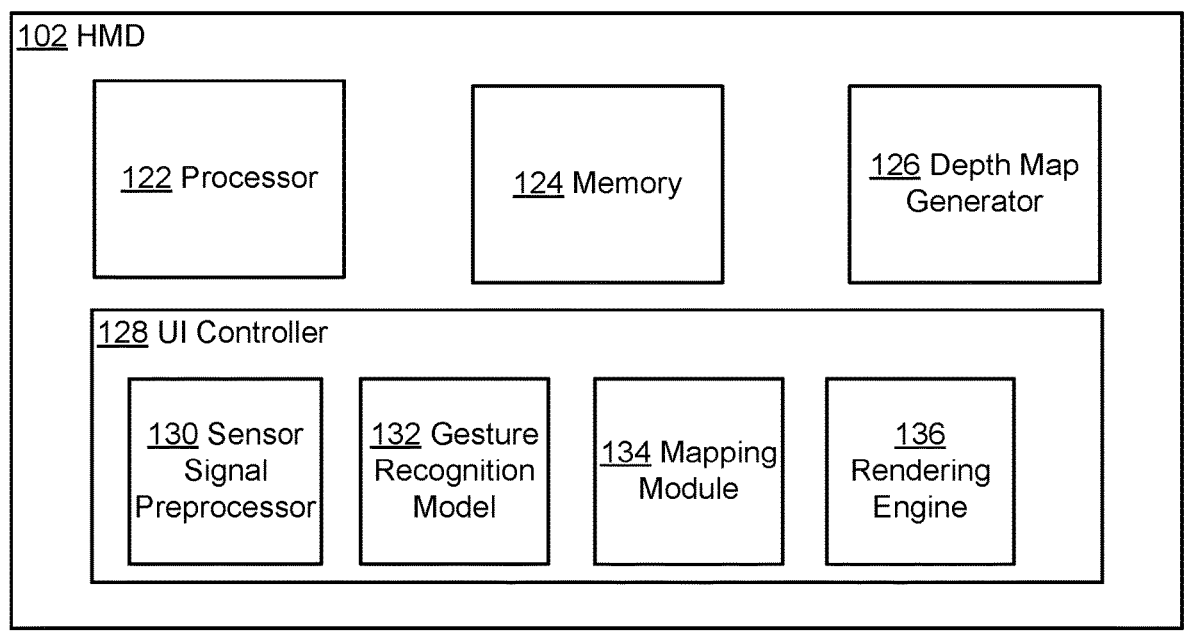
FIG. 1B illustrates a block diagram for implementing the system for contact space determination for user interface control of FIG. 1A.

For example, as shown in the block diagram of FIG. 1B, the HMD 102 may include a processor 122 (which may represent one or more processors), as well as a memory 124 (which may represent one or more memories (e.g., non-transitory computer readable storage media)). Although not shown separately in FIG. 1B, the HMD 102 may also include a battery, which may be used to power operations of the processor 122, the memory 124, and various other resources of the HMD 102. More detailed examples of the HMD 102 and various associated hardware/software resources are provided below, e.g., with respect to FIGS. 7, 8A, and 8B.

For purposes of the simplified example of FIG. 1B, the HMD 102 should be further understood to include a depth map generator 126, which may be configured to generate a depth map in conjunction with, or for use with, the rendering space 112. The depth map generator 126 may utilize depth data from one or more passive or active depth sensor(s), not separately illustrated in FIG. 1B, which may include, e.g., a time-of-flight (ToF) camera, LiDAR sensor, RGB camera, or GPS sensor. Using received, raw depth data, the depth map generator 126 may be configured to generate a depth map that captures information characterizing relative depths of detected or rendered objects with respect to a defined perspective or reference point. For example, such a depth map may be used to define or determine a depth of the user interface event 120a or the user interface event 116a within the rendering space 112.

The depth map generator 126 should be understood to represent and illustrate depth map software stored using the memory 124 and executed using the processor 122, and configured to process depth-related data captured by one or more of the herein-referenced depth sensors, or other suitable depth sensor(s). The depth map generator 126 may thus be capable of determining a per-pixel depth of each pixel (and associated object or aspect) within the rendering space 112. For example, such depth information may be captured and stored as a perspective image containing a depth value instead of a color value in each pixel. A depth map may be generated and stored, e.g., as a 2D array, or as a depth mesh (e.g., a real-time triangulated mesh).

A user interface controller 128 may be configured to provide and control the user interface 102b, including the rendering space 112. As described in more detail, below, with respect to the examples of FIGS. 3 and 4, the user interface controller 128 may receive one or more sensor signals from the motion sensors 106, 108, in conjunction with a depth map from the depth map generator 126 and any other information used to provide the features and functions referenced above with respect to the contact map 110 in the context of FIG. 1A.

For example, the user interface controller may include a sensor signal preprocessor 130. The sensor signal preprocessor 130 may be configured to buffer, synchronize, filter, debounce, or other preprocess sensor signals from the motion sensors 106, 108. For example, as the motion sensors 106, 108 may be positioned at different positions in or on the HMD 102, generated sensor signals may reach the user interface controller 128 at offset times, so that the sensor signal preprocessor 130 may be configured to buffer and synchronize the received signals. Debouncing may also be performed to avoid unwanted repetitions of received control signals.

Further, the sensor signal preprocessor 130 may be configured to reject or filter unwanted or unrelated portions of received sensor signals. For example, the user 104 may simultaneously be exhibiting various head movements or other body movements not related to desired operations of the user interface 102b, and such movements may be filtered by the sensor signal preprocessor 130.

In addition, the user interface controller 128 may represent or include software intended to be used with many different HMDs, or types of HMDs. Therefore, the sensor signal preprocessor 130 may be configured to provide calibration across all such HMDs. For example, different HMDs may have different types or numbers of motion sensors or other types of sensors, and/or may use different reference coordinate systems to define the rendering space 112 (e.g., may have different installed orientations). Consequently, as may be appreciated from the above description, the term calibration as used herein should be understood to refer to any processing actions taken to make a user experience and use of the user interface controller 128 consistent across multiple users and/or multiple HMDs.

A gesture recognition model 132 may be configured to receive the preprocessed signals from the sensor signal preprocessor 130 and determine user actions (e.g., touch events 114, 118), contact spaces 116, 118, and any gestures and user interface control events (such as the user interface events 116a, 120a) associated therewith. For example, the gesture recognition model 132 may characterize above-referenced aspects of the contact spaces 116, 120, or other aspects, including, e.g., a total size, shape, movement, or duration thereof, including combinations of different, overlapping or successive touch events.

It will be appreciated that the user interface controller 128 is highly configurable, and multiple types of known or future gesture recognition models may be used as the gesture recognition model 132 of FIG. 1B. Known examples of gesture recognition models (e.g., CNN-based models), as referenced above, may be configured to classify a received sensor signal as corresponding to one of a pre-defined set of known gestures, which may then be used for certain types of user interface control. In contrast, in FIG. 1A and FIG. 1B, the gesture recognition model 132 may be configured to recognize the contact map 110 and the contact spaces 116, 120 essentially as an image(s) constructed from the received and preprocessed sensor signals.

Such images may be associated with classified or known gestures, but, in contrast with existing techniques, enable a wider range of such gestures, and combinations thereof, which are more easily implemented, customized, and configured than in existing techniques. Moreover, such recognized gestures may be implemented with a type and level of spatial awareness, e.g., within the rendering space 112, not possible in existing techniques.

For example, a mapping module 134 may be configured to perform image-to-image translation between outputs of the gesture recognition model 132 representing the contact map 110 and contact space(s) 116, 120 at a point(s) in time to the rendering space 112 of the user interface 102b, as described above with respect to the user interface events 116a, 120a. Although illustrated separately in FIG. 1B for purposes of explanation and illustration, it will be appreciated that the gesture recognition model 132 and the mapping module 134 may be implemented as a single neural network. For example, the mapping module 134 may be implemented as output layer(s) of the gesture recognition model 132 that replace or augment existing classification layers.

Consequently, a rendering engine 136 may be configured to render the user interface 102b, including the rendering space 112. The rendering engine 136 may further render user interface events 116a, 120a at locations within the rendering space 112 that correspond to the contact spaces 116, 120 within the contact map 110. It will be appreciated that the rendering engine 136 may also implement virtually any features and functions associated with rendering the user interface 102b, which may vary widely based on, e.g., a nature of an application or operating system of which the user interface controller 128 is a part, or operating in conjunction therewith. Such features/functions are not described herein, except as may be helpful in understanding operations of the user interface controller 128 in providing the contact map 110 and associated user interface control techniques.

Figure 1C:
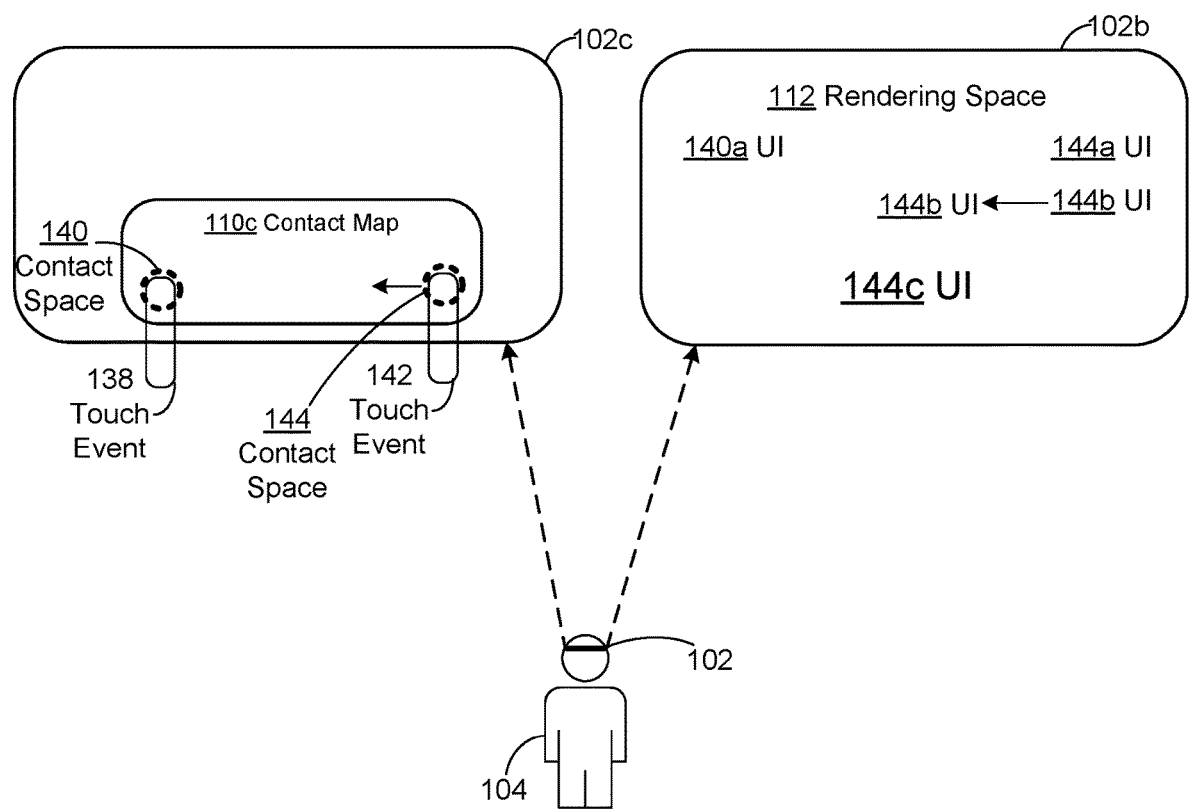
FIG. 1C illustrates additional use case scenarios for implementing the system of FIG. 1B.

For example, by way of further illustration, FIG. 1C illustrates additional use case scenarios enabled by described techniques. For example, in FIG. 1C, a contact map 110c is illustrated on a device surface 102c of the HMD 102 that may be different than the device surface 102a illustrated in FIG. 1A. For example, the device surface 102c may represent a side of the HMD 102, or an arm of the HMD 102 when the HMD 102 is implemented using smartglasses.

In FIG. 1C, a touch event 138 may cause a contact space 140 to be detected, while a touch event 142 may cause a contact space 144 to be detected. The contact space 140 may be detected with respect to a user interface 140a and the contact space 144 may be detected with respect to a user interface 144a.

For example, the rendering space 112 may be used to render two or more user interfaces in different portions or areas of the rendering space 112. In FIG. 1C, the user interface 140a may represent an individual user interface with various components, or may represent an individual one of such components, such as a cursor or other control element. Similar comments apply to the user interface 144a.

In a first example use case illustrated with respect to the user interface 140a and the user interface 144a, the two contact spaces 140, 144 may occur in a simultaneous or overlapping fashion. The user interface 140a and the user interface 144a may then also be presented in a corresponding simultaneous or overlapping fashion. For example, two cursors may be controlled at the same time.

A second example use case is illustrated with respect to a user interface 144b. In the example, the contact space 144 may correspond to the user interface 144b, which may also represent an entire user interface or any portion thereof. As indicated by corresponding arrows in FIG. 1C, a swiping touch gesture may be detected with respect to the touch event 142, which may result in a corresponding movement of the user interface 144b within the rendering space 112, as illustrated.

A third example use case is illustrated with respect to a user interface 144c. In the example, the touch event 138 and the touch event 142 may occur at the same time and may be interpreted as corresponding a rendered size of the user interface 144c. For example, a distance between the contact space 140 and the contact space 144 on the contact map 110c may be interpreted as corresponding to a rendered size of the user interface 144c.

A fourth example use case may also be understood with respect to the user interface 144c. In the example, touch-based shrinking or enlarging of the user interface 144c may be implemented. For example, decreases in the distance between the contact space 140 and the contact space 144 may be interpreted as shrinking the user interface 144c, while increases in the distance between the contact space 140 and the contact space 144 may be interpreted as enlarging the user interface 144c.

A fifth example use case may also be understood with respect to the user interface 144c. In the example, touch-based closing of the user interface 144c may be provided using a variety of techniques. For example, a swiping gesture detected with respect to the contact space 144 may be interpreted as a command to close the user interface 144c. In other examples, the contact space 144 may be used to control a cursor or other selection element that may be detected as selecting a closing action for the user interface 144c.

The various example use cases described herein should be understood to be non-limiting. For example, many other gestures and other uses of described contact spaces, and associated touch events, may be implemented for UI control. For example, touch events may be correlated with corresponding gestures and associated UI control based on an extent of pressure associated with a corresponding touch event, and/or on a duration of such a touch event.

Figure 2:
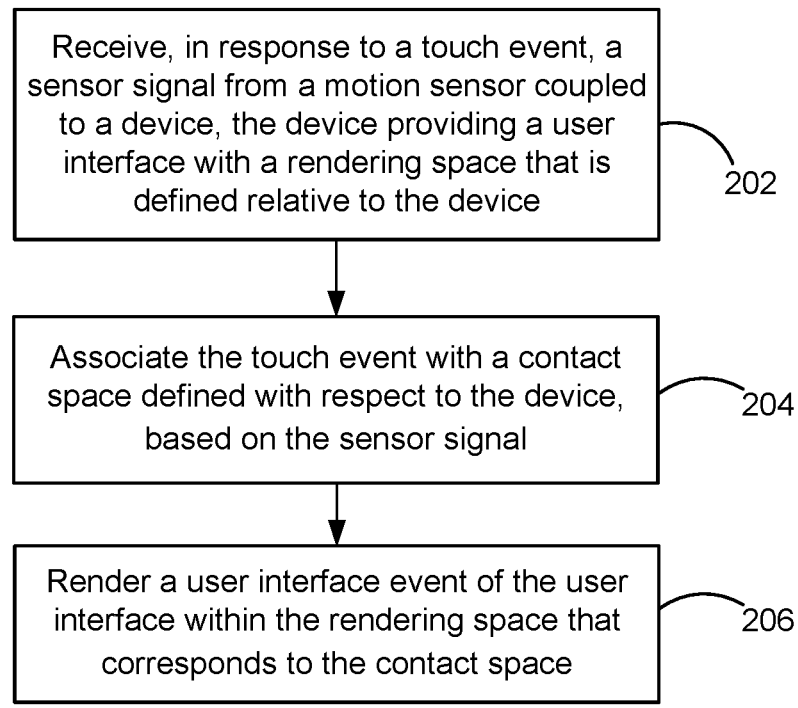
FIG. 2 is a flowchart illustrating example operations of the system of FIG. 1B.

FIG. 2 is a flowchart illustrating example operations of the system of FIG. 1. In the example of FIG. 2, operations 202-206 are illustrated as separate, sequential operations. However, in various example implementations, the operations 202-206 may be implemented in a different order than illustrated, in an overlapping or parallel manner, and/or in a nested, iterative, looped, or branched fashion. Further, various operations or sub-operations may be included, omitted, or substituted.

In FIG. 2, a sensor signal from a motion sensor coupled to a device may be received in response to a touch event, the device providing a user interface with a rendering space that is defined relative to the device (202). For example, sensor signal(s) from one or more of the motion sensors 106, 108 may be received in response to one or both of the touch events 114, 118. In FIGS. 1A and 1B, description is provided with respect to the HMD 102 as an example device, and other example devices are provided below, with respect to FIG. 7. Any such device may provide the user interface 102b with the rendering space 112 of FIG. 1A. For example, the sensor signal processor 130 of FIG. 1B may receive the sensor signals.

The touch event may be associated with a contact space defined with respect to the device, based on the sensor signal (204). For example, the touch events 114, 118 may be related to respective, corresponding contact spaces 116, 120 of the contact map 110 of FIG. 1A. For example, the gesture recognition model 132 may process outputs of the sensor signal preprocessor 130 to determine an image representation of the contact map 110, including the contact spaces 116, 120.

A user interface event of the user interface may be rendered within the rendering space that corresponds to the contact space (206). For example, the user interface 102b may have the user interface events 116a, 120a rendered within the rendering space 112. For example, the mapping module 134 of FIG. 1B may map the contact spaces 116, 120 at locations within the contact map 110 to respective, corresponding user interface events 116a, 120a within corresponding spatial locations within the rendering space 112, where the rendering engine 136 of FIG. 1B may be configured to execute the rendering of the user interface 102b with respect to the rendering space 112.

Figure 3:
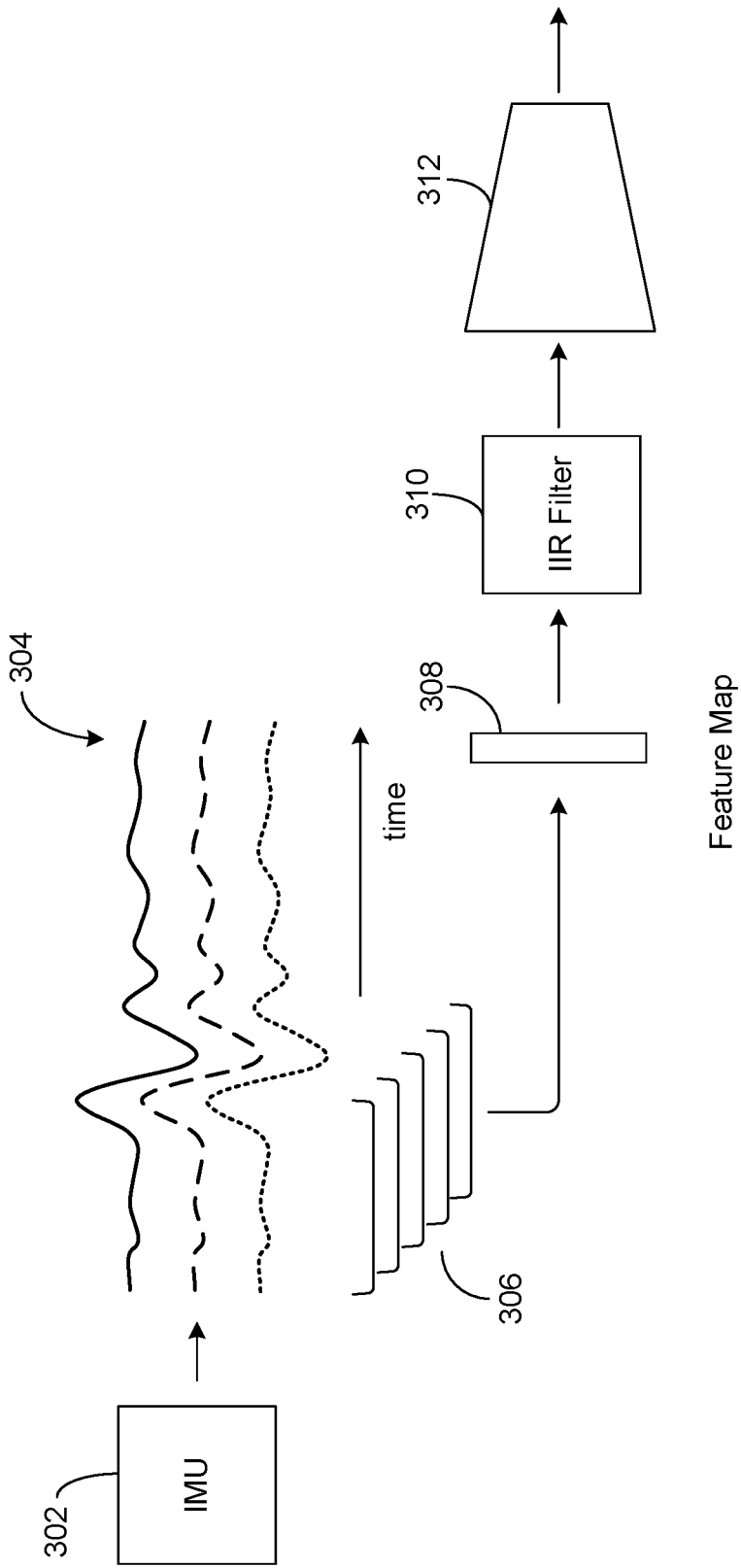
FIG. 3 is a block diagram of an alternate example of the system of FIG. 1B.

FIG. 3 is a block diagram of an alternate example of the system of FIG. 1B. In FIG. 3, an inertial measurement unit (IMU) 302 represents an example of one of the motion sensors 106, 108 of FIG. 1A. The IMU 302 may include or have access to, e.g., an accelerometer, gyroscope, magnetometer, or other motion-related signal information. For example, the IMU 302 may provide measurements for three degrees of freedom for each sensor component, including, e.g., measurements related to acceleration (in X, Y, Z coordinates); gyroscope (as pitch, yaw, roll), rotational acceleration, and various other features, each of which may be sampled with a designated sampling rate frequency.

Thus, the IMU 302 is illustrated as outputting various sensor signals 304 over a period of time. In FIG. 3, in more detail, successive, overlapping time windows 306 of sensor signals 304 may be collected and buffered for storage within a feature map 308. For example, the feature map 308 may represent an m×n matrix of 'm' features over 'n' time periods that effectively reformats the sensor signal(s) 304 into a matrix (or vector) format.

An infinite impulse response (IIR) filter 310 provides an example of the sensor signal preprocessor 130 of FIG. 1B. As discussed with respect to the sensor signal preprocessor 130, the IIR filter 310 may be configured to filter aspects or portions of the sensor signal(s) 304 that correspond to user movements not related to the gesture detection and implementation techniques described herein, or to calibrate operations for use with a particular implementation of the HMD 102.

The feature map 308 and the IIR filter 310 may also be configured to be compatible with a gesture detection model 312. That is, as referenced above, the system of FIG. 3 may be configured to adapt an existing gesture detection model for use with the techniques of FIGS. 1A, 1B, and 2, and for the particular user 104 and the particular HMD 102. For example, the feature map 308 and the IIR filter 310 may express desired features or aspects of the sensor signals 304 in a format that is compatible with the gesture detection model 312.

In the example of FIG. 3, the feature map 308 and the IIR filter 310 may primarily be provided for signal formatting and, e.g., noise reduction, where operations of the IIR filter 310 in providing noise reduction that is customized and calibrated, as just referenced. In addition, as also referenced, the IMU 302 and other motion sensors may have a mounting orientation(s) that varies among different HMD implementations. Additional or alternative signal pre-processing may be performed to, e.g., virtually re-mount an IMU(s) on different HMDs to provide reorientation towards a common reference frame.

Such types of calibration, including calibrating the IIR filter 310 as well, may be performed in a factory setting to provide desired virtual re-mounting for compatibility with the gesture detection model 312 being used. These and related calibration techniques provide highly customizable implementations of the user interface controller 128, without requiring training of a new/different implementation of the gesture detection model 134 of FIG. 1B or the gesture detection model 312 of FIG. 3 for each new/different HMD.

Some aspects of calibration may also be performed by the individual user 104. For example, upon initial use of the HMD 102, a noise floor for the sensor signals 304 may be initially obtained to obtain spectrum calibration data, and the IIR filter 310 may then be fit to the spectrum calibration data to obtain a desired signal to noise ratio.

Thus, use of the IMU 302 enables fine-grained detection of characteristics of touch events. For example, the IMU 302, being rigidly mounted to the HMD 102, is able to capture multiple types of touch interactions, including taps, swipes, pinches, rotations, holds, and various other types of interactions. For example, a tap may be detected as a vibration at a particular angle, while finger movement in an orthogonal direction is registered along a different axis of the IMU 302.

FIG. 4 is a block diagram of an alternate example of the system of FIG. 1B. In the example of FIG. 4, as in FIG. 3, IMU signals are frequently captured and sampled as new updates arrive. In FIG. 4, an array of IMUs dispersed over a HMD, such as the HMD 102, is used.

In particular, as shown, FIG. 4 illustrates a first IMU 402a and an Nth IMU 402b of the array. The IMUs 402a, 402b are illustrated as outputting respective sets of sensor signals 404a, 404b over a period of time. As in FIG. 3, successive, overlapping time windows 406a, 406b of sensor signals 404a, 404b may be collected and buffered for storage within corresponding feature maps 408a, 408b. IIR filters 410a, 410b, and potentially other types of sensor signal preprocessing as described above, may be provided for corresponding IMUs 402a, 402b.

The feature maps 408a, 408b and the IIR filters 410a, 410b may also be configured to be compatible with a gesture detection model 312. That is, as referenced above, the system of FIG. 3 may be configured to adapt an existing gesture detection model for use with the techniques of FIGS. 1A, 1B, and 2, and for the particular user 104 and the particular HMD 102. For example, the feature map 308 and the IIR filter 310 may express desired features or aspects of the sensor signals 304 in a format that is compatible with the gesture detection model 312.

In FIG. 4, a gesture detection model 414 includes a multi-head architecture in which an attention head 411a and an attention head 411b receive filtered outputs of the IIR filters 410a, 410b, respectively. For example, the attention heads 411a, 411b may independently calculate attention weights for their corresponding inputs, which may then be combined and processed through a fully connected layer(s) of an encoder 412.

The encoder 412 may be included with a corresponding decoder 418 in an autoencoder bottleneck 416 for use in mapping detected contact spaces to corresponding rendering spaces, as described above with respect to FIG. 1. In more detail, the autoencoder bottleneck 416 refers to a technique for turning a relatively high-dimensional input into a latent low-dimensional code (with encoder 412) and then provide a reconstruction using the latent code at the decoder 418.

For example, the encoder 412 may be configured as a set of convolutional blocks and pooling modules to compress combined inputs from the attention heads 411a, 411b. The decoder 418 may include upsampling modules and convolutional blocks that restore or reconstruct the input (e.g., with reduced noise). By restricting a flow of information, the autoencoder bottleneck 416 effectively enables the most important, e.g., desired, information to pass through, thereby forming a knowledge representation of the input and providing correlations between different received inputs. Put another way, the decoder 418 decompresses a compressed knowledge representation to provide an improved and more useful image from latent attributes of the image.

Thus, the multi-head architecture of FIG. 4 provides an image to image translator at an end stage to estimate contact spaces on a contact map, which may then be processed by map assignment logic to relate device surfaces of the HMD 102 to the estimated contact map, and thereby to a rendering space of a user interface of the HMD 102.

FIG. 5 illustrates an example use case scenario for the systems of FIGS. 1B and 4. In FIG. 5, a device surface 502 may represent, e.g., a face of a pair of smart goggles, which may be recognized as a contact map (similar to the contact map 110 of FIG. 1A). Then, a touch event 503 may be recognized through the use of a pool of IMU sensors 504a, 504b, 504c, 504d that are dispersed around a perimeter of the device surface 502.

For example, the touch event 503 may include placement of a single finger on the device surface. Such finger placement may be detected by each of the IMUs 504a, 504b, 504c, 504d, but with differing amplitudes that vary based on proximity of each IMU to the touch event 503.

For example, as shown, the IMU 504c closest to the touch event 503 may experience the largest amplitude, indicated by a relative size of an arrow 506c. The IMU 504a, being next-closest to the touch event 503, may experience a second largest amplitude, indicated by a relative size of an arrow 506a. More distance IMUs 504b and 504d may detect signals with correspondingly smaller amplitudes, represented by relative sizes of respective arrows 506b and 506d.

In the example of FIG. 5, a user interface 508 visible to the user 104 when using/wearing the smart goggles may be providing with a VR environment 510 as an example of the rendering space 112 of FIG. 1A. Then, a punch through area 512 may be provided in response to the touch event 503, so that the user 104 may be provided with a window through the VR environment 510 and into a surrounding real-world environment.

As described, the punch through area 512 may be provided with a size, and in a location, corresponding to the touch event 503. For example, the touch event 503 occurring on a right side of the user 104 may result in the punch through area 512 also occurring on the right side of the user 104. Of course, any desired mapping may be used to relate touch events with subsequent user interface events such as the punch through area 512.

In the example of FIG. 6, a touch event includes two fingers 603a, 603b being placed on the device surface (contact map) 502. As in FIG. 5, such finger placement may be detected by each of the IMUs 504a, 504b, 504c, 504d, but with differing amplitudes that vary based on proximity of each IMU to the touch event of fingers 603a, 603b.

For example, as shown, the closest IMU 504c may experience the largest amplitude, indicated by a relative size of an arrow 606c, which may be larger than the amplitude indicated by the arrow 506c of FIG. 5. Further in FIG. 6, amplitudes of the IMUs 504a, 504d, indicated by respective arrows 606a, 606d, are smaller than the amplitude indicated by the arrow 606c, but are both larger than corresponding amplitudes/arrows 506a, 506d in FIG. 5. Similarly, the amplitude indicated by the arrow 606b is the smallest of FIG. 6, but larger than that of corresponding arrow 506b of FIG. 5.

Thus, FIG. 6 illustrates that the distributed pool of IMU sensors 504a, 504b, 504c, 504d may be used by described techniques to determine fine-grained nuances and differences between touch events 503 and 603a/603b, even when touch events are very similar in type or kind. Such differences may be usefully reflected in operation of the user interface 508, e.g., of the VR environment 510.

For example, in FIG. 6, a resulting punch through area 612 may be larger than a punch through area 512 of FIG. 5. Moreover, additional or alternative finger placement/movement aspects may be used for desired effects. For example, placement of three fingers may result in yet a larger punch through area. In other examples, horizontal (as compared to vertical) finger placement may have a specified effect. Additionally, as described above, the device surface 502 should be understood to potentially represent two or more device surfaces, and each such device surface (at its respective location) may be assigned different mappings and gestures, as desired.

Moreover, FIGS. 5 and 6 illustrate that finger movements or changes over both a space of the device surface (contact map) 502 and over a time during which the touch event(s) occurs may be used to provide spatiotemporally complex gestures. For example, the user 104 may exhibit finger movement across a face of the device surface 502 at fast or slow speeds, either linearly or rotationally, and combinations of two or more fingers may be used to indicate desired gestures for corresponding rendering effects.

Figure 7:
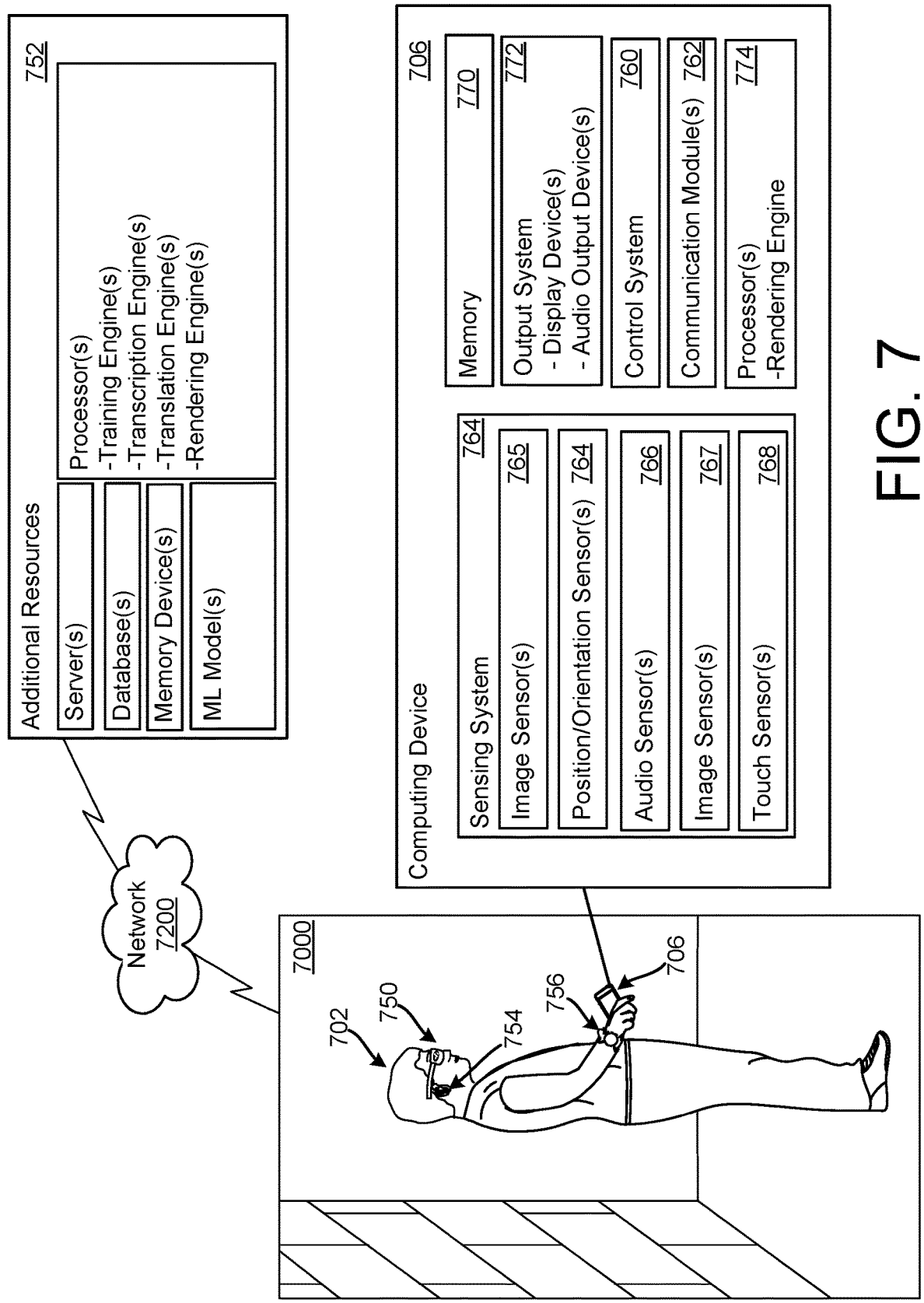
FIG. 7 is a third person view of a user in an ambient computing environment.

FIG. 7 is a third person view of a user 702 (analogous to the user 104 of FIG. 1) in an ambient environment 7000, with one or more external computing systems shown as additional resources 752 that are accessible to the user 702 via a network 7200. FIG. 7 illustrates numerous different wearable devices that are operable by the user 702 on one or more body parts of the user 702, including a first wearable device 750 in the form of glasses worn on the head of the user, a second wearable device 754 in the form of ear buds worn in one or both ears of the user 702, a third wearable device 756 in the form of a watch worn on the wrist of the user, and a computing device 706 held by the user 702. In FIG. 7, the computing device 706 is illustrated as a handheld computing device but may also be understood to represent any personal computing device, such as a table or personal computer.

In some examples, the first wearable device 750 is in the form of a pair of smart glasses including, for example, a display, one or more images sensors that can capture images of the ambient environment, audio input/output devices, user input capability, computing/processing capability and the like. Additional examples of the first wearable device 750 are provided below, with respect to FIGS. 8A and 8B.

In some examples, the second wearable device 754 is in the form of an ear worn computing device such as headphones, or earbuds, that can include audio input/output capability, an image sensor that can capture images of the ambient environment 7000, computing/processing capability, user input capability and the like. In some examples, the third wearable device 756 is in the form of a smart watch or smart band that includes, for example, a display, an image sensor that can capture images of the ambient environment, audio input/output capability, computing/processing capability, user input capability and the like. In some examples, the handheld computing device 706 can include a display, one or more image sensors that can capture images of the ambient environment, audio input/output capability, computing/processing capability, user input capability, and the like, such as in a smartphone. In some examples, the example wearable devices 750, 754, 756 and the example handheld computing device 706 can communicate with each other and/or with external computing system(s) 752 to exchange information, to receive and transmit input and/or output, and the like. The principles to be described herein may be applied to other types of wearable devices not specifically shown in FIG. 7 or described herein.

The user 702 may choose to use any one or more of the devices 706, 750, 754, or 756, perhaps in conjunction with the external resources 752, to implement any of the implementations described above with respect to FIGS. 1-6. For example, the user 702 may use an application executing on the device 706 and/or the smartglasses 750 to execute the user interface controller 128 of FIG. 1B.

The device 706 may access the additional resources 752 to facilitate the aspects of the various techniques described herein, or related techniques. In some examples, the additional resources 752 may be partially or completely available locally on the device 706. In some examples, some of the additional resources 752 may be available locally on the device 706, and some of the additional resources 752 may be available to the device 706 via the network 7200. As shown, the additional resources 752 may include, for example, server computer systems, processors, databases, memory storage, and the like. In some examples, the processor(s) may include training engine(s), transcription engine(s), translation engine(s), rendering engine(s), and other such processors.

The device 706 may operate under the control of a control system 760. The device 706 can communicate with one or more external devices, either directly (via wired and/or wireless communication), or via the network 7200. In some examples, the one or more external devices may include various ones of the illustrated wearable computing devices 750, 754, 756, another mobile computing device similar to the device 706, and the like. In some implementations, the device 706 includes a communication module 762 to facilitate external communication. In some implementations, the device 706 includes a sensing system 764 including various sensing system components. The sensing system components may include, for example, one or more image sensors 765, one or more position/orientation sensor(s) 764 (including for example, an inertial measurement unit, an accelerometer, a gyroscope, a magnetometer and other such sensors), one or more audio sensors 766 that can detect audio input, one or more image sensors 767 that can detect visual input, one or more touch input sensors 768 that can detect touch inputs, and other such sensors. The device 706 can include more, or fewer, sensing devices and/or combinations of sensing devices. Various ones of the various sensors may be used individually or together to perform the types of saliency detection described herein.

Captured still and/or moving images may be displayed by a display device of an output system 772, and/or transmitted externally via a communication module 762 and the network 7200, and/or stored in a memory 770 of the device 706. The device 706 may include one or more processor(s) 774. The processors 774 may include various modules or engines configured to perform various functions. In some examples, the processor(s) 774 may include, e.g., training engine(s), transcription engine(s), translation engine(s), rendering engine(s), and other such processors. The processor(s) 774 may be formed in a substrate configured to execute one or more machine executable instructions or pieces of software, firmware, or a combination thereof. The processor(s) 774 can be semiconductor-based including semiconductor material that can perform digital logic. The memory 770 may include any type of storage device or non-transitory computer-readable storage medium that stores information in a format that can be read and/or executed by the processor(s) 774. The memory 770 may store applications and modules that, when executed by the processor(s) 774, perform certain operations. In some examples, the applications and modules may be stored in an external storage device and loaded into the memory 770.

Although not shown separately in FIG. 7, it will be appreciated that the various resources of the computing device 706 may be implemented in whole or in part within one or more of various wearable devices, including the illustrated smartglasses 750, earbuds 754, and smartwatch 756, which may be in communication with one another to provide the various features and functions described herein.

Figure 8A:
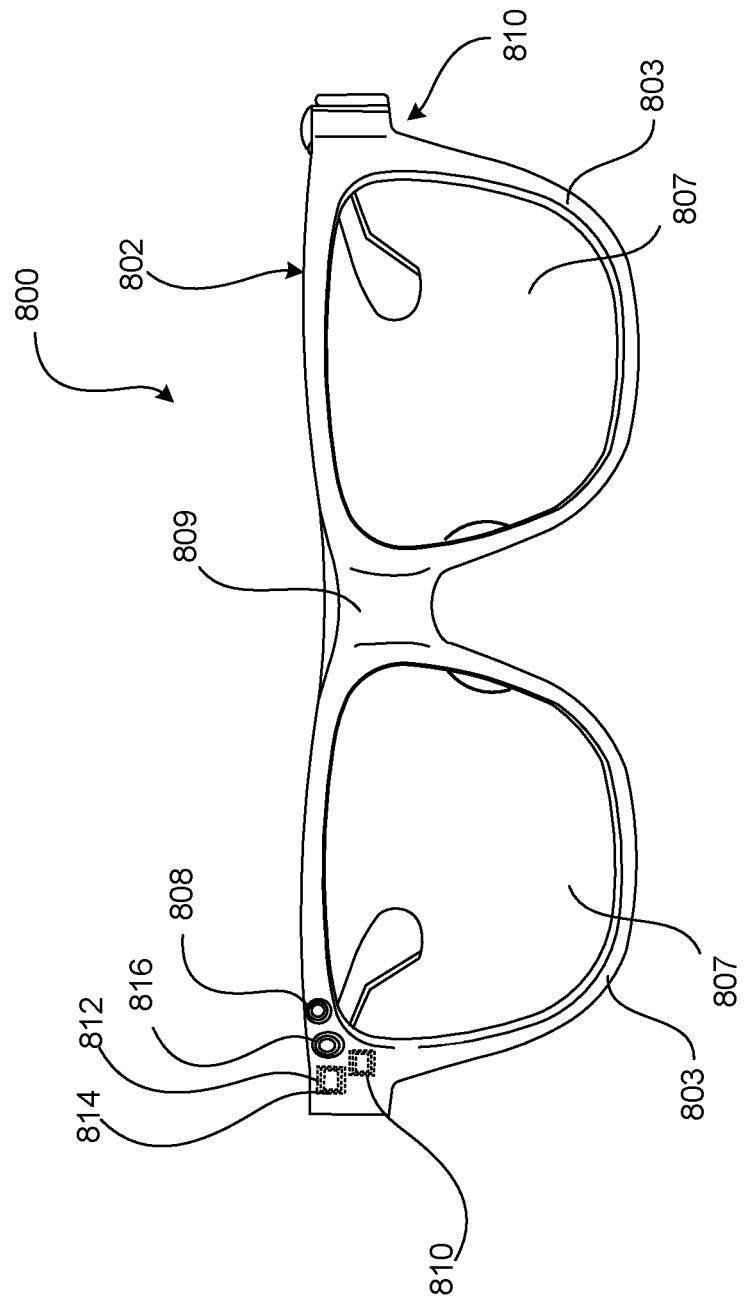
FIGS. 8A and 8B illustrate front and rear views of an example implementation of a pair of smartglasses.
Figure 8B:
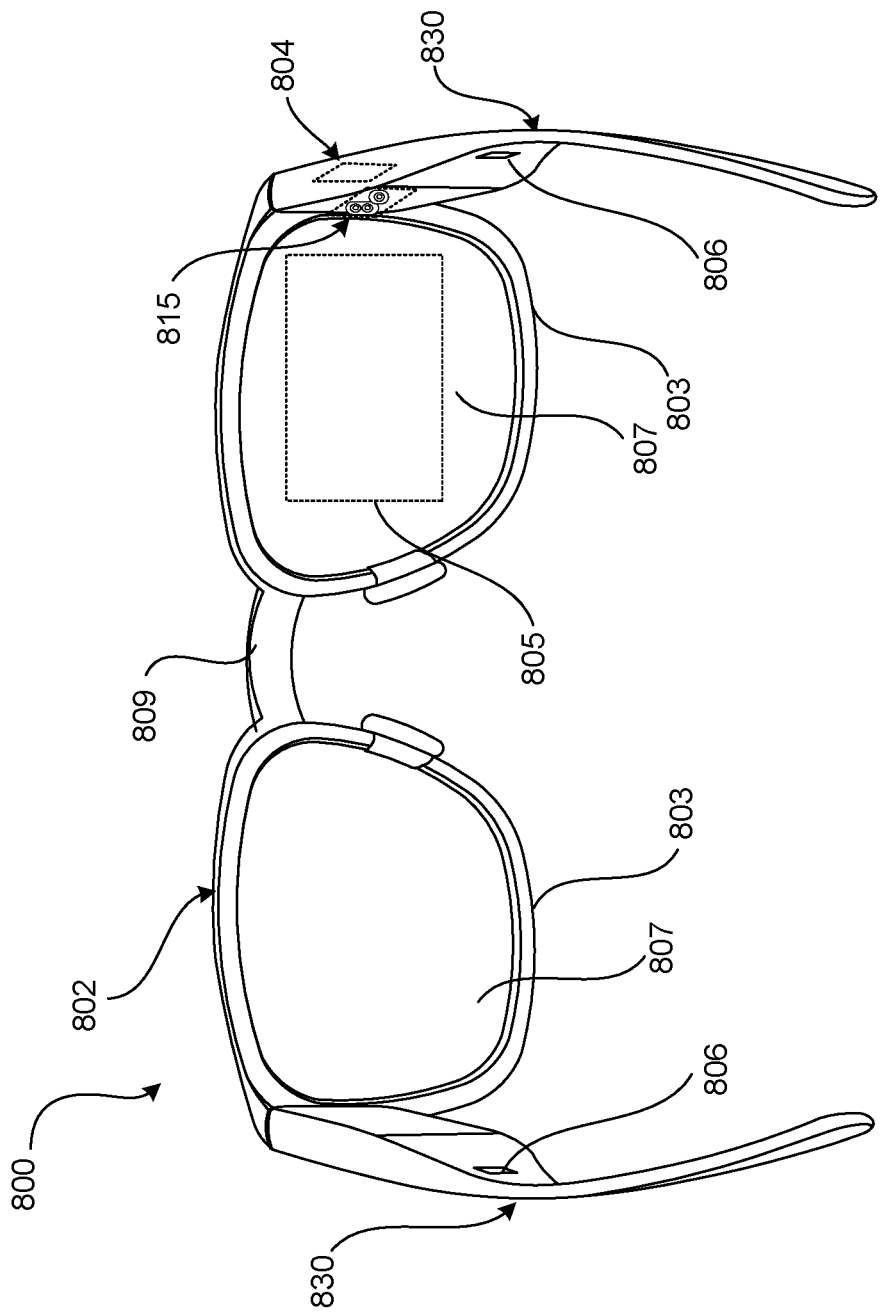

An example head mounted wearable device 800 in the form of a pair of smart glasses is shown in FIGS. 8A and 8B, for purposes of discussion and illustration. The example head mounted wearable device 800 includes a frame 802 having rim portions 803 surrounding glass portion, or lenses 807, and arm portions 830 coupled to a respective rim portion 803. In some examples, the lenses 807 may be corrective/prescription lenses. In some examples, the lenses 807 may be glass portions that do not necessarily incorporate corrective/prescription parameters. A bridge portion 809 may connect the rim portions 803 of the frame 802. In the example shown in FIGS. 8A and 8B, the wearable device 800 is in the form of a pair of smart glasses, or augmented reality glasses, simply for purposes of discussion and illustration.

In some examples, the wearable device 800 includes a display device 804 that can output visual content, for example, at an output coupler providing a visual display area 805, so that the visual content is visible to the user. In the example shown in FIGS. 8A and 8B, the display device 804 is provided in one of the two arm portions 830, simply for purposes of discussion and illustration. Display devices 804 may be provided in each of the two arm portions 830 to provide for binocular output of content. In some examples, the display device 804 may be a see through near eye display. In some examples, the display device 804 may be configured to project light from a display source onto a portion of teleprompter glass functioning as a beamsplitter seated at an angle (e.g., 30-45 degrees). The beamsplitter may allow for reflection and transmission values that allow the light from the display source to be partially reflected while the remaining light is transmitted through. Such an optic design may allow a user to see both physical items in the world, for example, through the lenses 807, next to content (for example, digital images, user interface elements, virtual content, and the like) output by the display device 804. In some implementations, waveguide optics may be used to depict content on the display device 804.

The example wearable device 800, in the form of smart glasses as shown in FIGS. 8A and 8B, includes one or more of an audio output device 806 (such as, for example, one or more speakers), an illumination device 808, a sensing system 810, a control system 812, at least one processor 814, and an outward facing image sensor 816 (for example, a camera). In some examples, the sensing system 810 may include various sensing devices and the control system 812 may include various control system devices including, for example, the at least one processor 814 operably coupled to the components of the control system 812. In some examples, the control system 812 may include a communication module providing for communication and exchange of information between the wearable device 800 and other external devices. In some examples, the head mounted wearable device 800 includes a gaze tracking device 815 to detect and track eye gaze direction and movement. Data captured by the gaze tracking device 815 may be processed to detect and track gaze direction and movement as a user input. In the example shown in FIGS. 8A and 8B, the gaze tracking device 815 is provided in one of two arm portions 830, simply for purposes of discussion and illustration. In the example arrangement shown in FIGS. 8A and 8B, the gaze tracking device 815 is provided in the same arm portion 830 as the display device 804, so that user eye gaze can be tracked not only with respect to objects in the physical environment, but also with respect to the content output for display by the display device 804. In some examples, gaze tracking devices 815 may be provided in each of the two arm portions 830 to provide for gaze tracking of each of the two eyes of the user. In some examples, display devices 804 may be provided in each of the two arm portions 830 to provide for binocular display of visual content.

The wearable device 800 is illustrated as glasses, such as smartglasses, augmented reality (AR) glasses, or virtual reality (VR) glasses. More generally, the wearable device 800 may represent any head-mounted device (HMD), including, e.g., goggles, helmet, or headband, or another device (e.g., smartphone) mounted to a user's head using an external frame for use as a HMD. Even more generally, the wearable device 800 and the computing device 706 may represent any wearable device(s), handheld computing device(s), or combinations thereof.

Use of the wearable device 800, and similar wearable or handheld devices such as those shown in FIG. 7, enables useful and convenient use case scenarios of implementations of FIGS. 1-6. For example, any specified portions of the frame 802 and/or the arm portions 830 may be designated as a contact map(s), such as the contact map 110 of FIG. 1. For example, a portion of the frame 802 enclosing the lenses 807 may be used to control a cursor or other control aspect of a user interface in a horizontal plane (x, y coordinates), while one or both of the arm portions 830 may be used to control a cursor or other control aspect of the same user interface in a depth direction (z coordinates).

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as modules, programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor, or LED (light emitting diode)) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback), and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the description and claims.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Further to the descriptions above, a user is provided with controls allowing the user to make an election as to both if and when systems, programs, devices, networks, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that user information is removed. For example, a user's identity may be treated so that no user information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

The computer system (e.g., computing device) may be configured to wirelessly communicate with a network server over a network via a communication link established with the network server using any known wireless communications technologies and protocols including radio frequency (RF), microwave frequency (MWF), and/or infrared frequency (IRF) wireless communications technologies and protocols adapted for communication over the network.

In accordance with aspects of the disclosure, implementations of various techniques described herein may be implemented in digital electronic circuitry, or in computer hardware, firmware, software, or in combinations of them. Implementations may be implemented as a computer program product (e.g., a computer program tangibly embodied in an information carrier, a machine-readable storage device, a computer-readable medium, a tangible computer-readable medium), for processing by, or to control the operation of, data processing apparatus (e.g., a programmable processor, a computer, or multiple computers). In some implementations, a tangible computer-readable storage medium may be configured to store instructions that when executed cause a processor to perform a process. A computer program, such as the computer program(s) described above, may be written in any form of programming language, including compiled or interpreted languages, and may be deployed in any form, including as a standalone program or as a module, component, subroutine, or other unit suitable for use in a computing environment. A computer program may be deployed to be processed on one computer or on multiple computers at one site or distributed across multiple sites and interconnected by a communication network.

Specific structural and functional details disclosed herein are merely representative for purposes of describing example implementations. Example implementations, however, may be embodied in many alternate forms and should not be construed as limited to only the implementations set forth herein.

The terminology used herein is for the purpose of describing particular implementations only and is not intended to be limiting of the implementations. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 130 degrees or at other orientations) and the spatially relative descriptors used herein may be interpreted accordingly.

Example implementations of the concepts are described herein with reference to cross-sectional illustrations that are schematic illustrations of idealized implementations (and intermediate structures) of example implementations. As such, variations from the shapes of the illustrations as a result, for example, of manufacturing techniques and/or tolerances, are to be expected. Thus, example implementations of the described concepts should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of example implementations.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present implementations.

Unless otherwise defined, the terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A method comprising:
   receiving, in response to a touch event, a sensor signal from a motion sensor coupled to a device, the device providing a user interface with a rendering space that is defined relative to the device;
   associating the touch event with a contact space defined with respect to the device, based on the sensor signal; and rendering a user interface event of the user interface within the rendering space that corresponds to the contact space.

2. The method of claim 1, further comprising:
rendering the user interface event at a rendering location within the rendering space that corresponds to a contact space location within a contact map defined with respect to the device.

3. The method of claim 1, further comprising:
receiving, in response to a second touch event, a second sensor signal;
relating the second touch event to a second contact space defined with respect to the device, based on the second sensor signal; and
rendering a second user interface event of the user interface within the rendering space that corresponds to the second contact space.

4. The method of claim 3, further comprising:
using the contact space to provide user interface control of the user interface, including the user interface event, in a horizontal plane; and
using the second contact space to provide user interface control of the user interface, including the second user interface event, in a depth plane that is perpendicular to the horizontal plane.

5. The method of claim 1, further comprising:
receiving at least two sensor signals from at least two motion sensors mounted on the device; and
relating the touch event to the contact space, based on the at least two sensor signals.

6. The method of claim 1, further comprising:
relating an area of the contact space to the user interface event.

7. The method of claim 1, further comprising:
relating the touch event to the contact space using a gesture detection neural network.

8. The method of claim 1, wherein the device includes a head mounted device (HMD).

9. The method of claim 1, further comprising:
receiving the sensor signal from an inertial measurement unit (IMU).

10. The method of claim 1, further comprising:
defining a position of the contact space within a contact map defined with respect to the device.

11. The method of claim 1, further comprising:
detecting a second touch event; and
rendering a second user interface in response to the second touch event.

12. The method of claim 1, further comprising:
detecting a swiping touch gesture in conjunction with the touch event; and
rendering the user interface event including moving the user interface within the rendering space in correspondence with the swiping touch gesture.

13. The method of claim 1, further comprising:
detecting a second contact space associated with a second touch event; and
rendering the user interface event including rendering the user interface with a size determined from a distance between the contact space and the second contact space.

14. The method of claim 13, further comprising:
detecting a change in the distance between the contact space and the second contact space; and
changing the size of the user interface, based on the change in the distance.

15. The method of claim 1, wherein the user interface event includes closing the user interface.

16. The method of claim 1, wherein a size of a surface area of the contact space corresponding with a size of the user interface event within the rendering space.

17. A computer program product, the computer program product being tangibly embodied on a non-transitory computer-readable storage medium and comprising instructions that, when executed by at least one computing device, are configured to cause the at least one computing device to:
receive, in response to a touch event, a sensor signal from a motion sensor coupled to a device, the device providing a user interface with a rendering space that is defined relative to the device;
associate the touch event with a contact space defined with respect to the device, based on the sensor signal; and
render a user interface event of the user interface within the rendering space that corresponds to the contact space.

18. The computer program product of claim 17, wherein the instructions, when executed by the at least one computing device, are further configured to cause the at least one computing device to:
receive at least two sensor signals from at least two motion sensors mounted on the device; and
relate the touch event to the contact space, based on the at least two sensor signals.

19. The computer program product of claim 17, wherein the instructions, when executed by the at least one computing device, are further configured to cause the at least one computing device to:
relate an area of the contact space to the user interface event.

20. The computer program product of claim 17, wherein the instructions, when executed by the at least one computing device, are further configured to cause the at least one computing device to:
relate the touch event to the contact space using a gesture detection neural network.

21. The computer program product of claim 17, wherein the instructions, when executed by the at least one computing device, are further configured to cause the at least one computing device to:
render the user interface event at a rendering location within the rendering space that corresponds to a contact space location within a contact map defined with respect to the device.

22. The computer program product of claim 17, wherein the instructions, when executed by the at least one computing device, are further configured to cause the at least one computing device to:
receive, in response to a second touch event, a second sensor signal;
relate the second touch event to a second contact space defined with respect to the device, based on the second sensor signal; and
render a second user interface event of the user interface within the rendering space that corresponds to the second contact space.

23. The computer program product of claim 22, wherein the instructions, when executed by the at least one computing device, are further configured to cause the at least one computing device to:
use the contact space to provide user interface control of the user interface, including the user interface event, in a horizontal plane; and use the second contact space to provide user interface control of the user interface, including the second user interface event, in a depth plane that is perpendicular to the horizontal plane.

24. A wearable device comprising:
at least one frame for positioning the wearable device on a body of a user;
at least one display;
at least one processor; and
at least one memory, the at least one memory storing a set of instructions, which, when executed, cause the at least one processor to:
receive, in response to a touch event, a sensor signal from a motion sensor coupled to the wearable device, the wearable device providing a user interface using the at least one display, with a rendering space that is defined relative to the wearable device;
associate the touch event with a contact space defined with respect to the wearable device, based on the sensor signal; and
render a user interface event of the user interface within the rendering space that corresponds to the contact space.

25. The wearable device of claim 24, wherein the set of instructions, when executed by the at least one processor, are further configured to cause the wearable device to:
receive at least two sensor signals from at least two motion sensors mounted on the wearable device; and
relate the touch event to the contact space, based on the at least two sensor signals.

26. The wearable device of claim 24, wherein the set of instructions, when executed by the at least one processor, are further configured to cause the wearable device to:
render the user interface event at a rendering location within the rendering space that corresponds to a contact space location within a contact map defined with respect to a surface of the wearable device.

\* \* \* \* \*